(12) United States Patent
Auvity et al.

(10) Patent No.: US 6,425,818 B1
(45) Date of Patent: Jul. 30, 2002

(54) INTERIOR AIR PROCESSING CASING, ESPECIALLY FOR AN AUTOMOBILE VEHICLE

(75) Inventors: Michel Auvity, Velizy; Michel Grellier, Fresnes, both of (FR); Giancarlo Giordano, Turin (IT)

(73) Assignee: Valeo Climatisation, La Verriere (FR)

( * ) Notice: Subject to any disclaimer, the term of this patent is extended or adjusted under 35 U.S.C. 154(b) by 0 days.

(21) Appl. No.: 09/684,897

(22) Filed: Oct. 10, 2000

(30) Foreign Application Priority Data

Oct. 8, 1999 (FR) .............................................. 9912566

(51) Int. Cl.[7] .............................................. F24F 7/007
(52) U.S. Cl. ...................... 454/121; 454/144; 454/126; 237/12.3 B
(58) Field of Search ................................. 454/121, 126, 454/127, 144, 156; 165/42, 43, 204, 203

(56) References Cited

U.S. PATENT DOCUMENTS

| | | | |
|---|---|---|---|
| 5,109,755 A | 5/1992 | Guillemin | |
| 5,673,964 A | * 10/1997 | Roan et al. | 296/208 |
| 6,048,263 A | * 4/2000 | Uchida et al. | 454/121 |
| 6,062,298 A | * 5/2000 | Lee | 165/422 |

FOREIGN PATENT DOCUMENTS

| | | |
|---|---|---|
| EP | 0756955 | 2/1997 |
| FR | 2479106 | 10/1981 |
| FR | 2740398 | 4/1997 |

* cited by examiner

*Primary Examiner*—Harold Joyce
*Assistant Examiner*—Derek S. Boles
(74) *Attorney, Agent, or Firm*—Liniak, Berenato, Longacre & White

(57) ABSTRACT

An enclosure for treating air (1) of a passenger compartment, especially of a motor vehicle, comprises an inlet (2) which supplies cool air to a mixing chamber (4) and a heating chamber (5) supplying the mixing chamber with heated air. It further comprises a front channel (12) supplied from the mixing chamber with treated air intended for a front area of the passenger compartment, and a rear channel (15) supplied from the mixing chamber (4) with treated air intended for a rear area of the passenger compartment.

18 Claims, 2 Drawing Sheets

Figure 1:
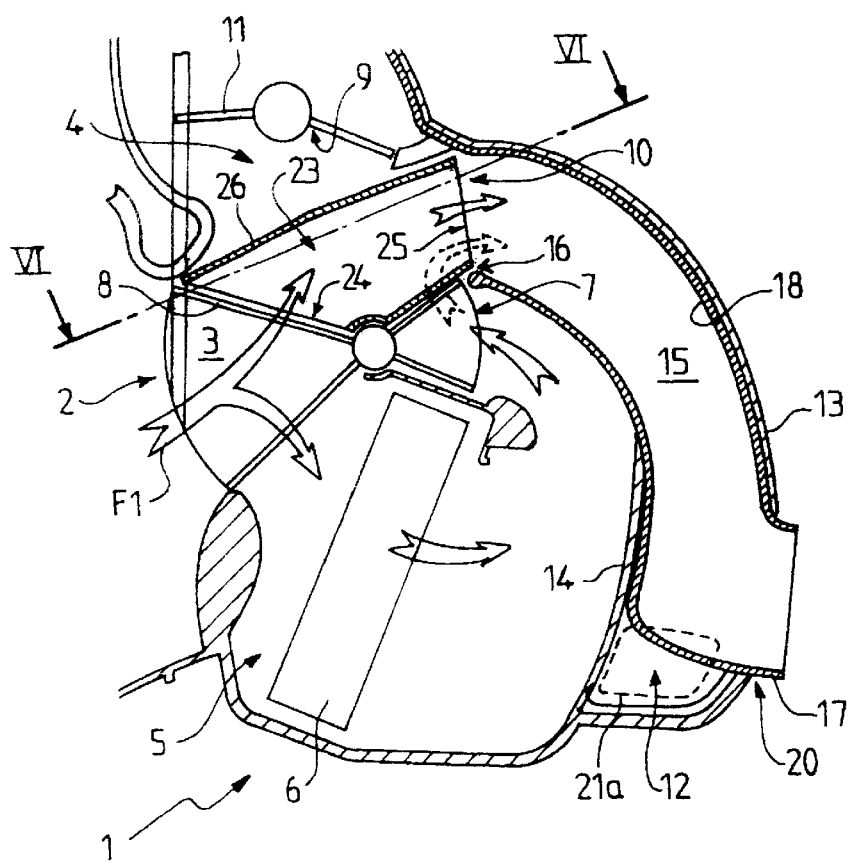

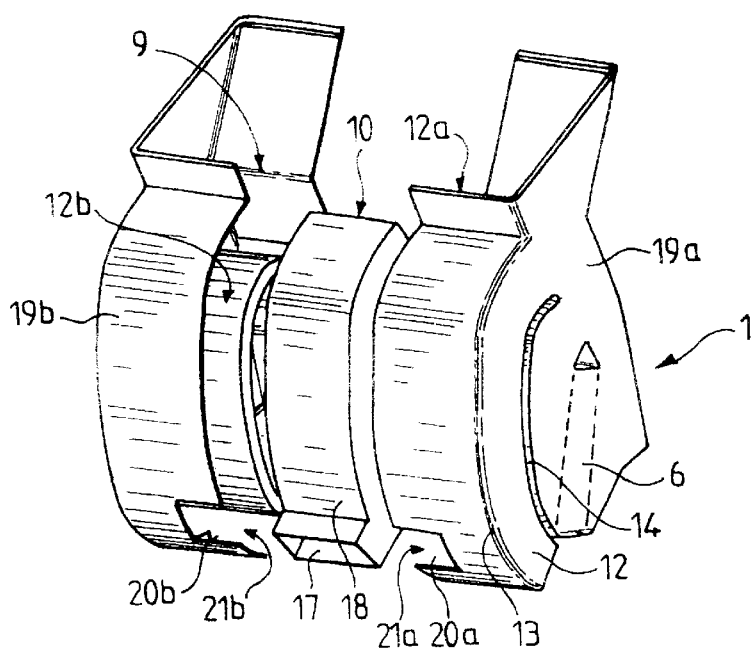
FIG. 3
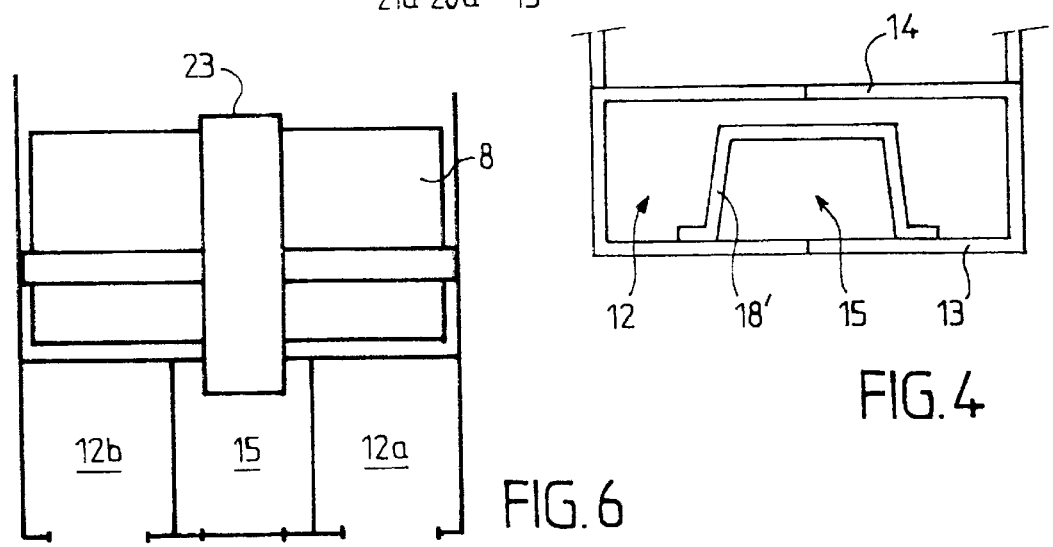
FIG. 4
FIG. 6
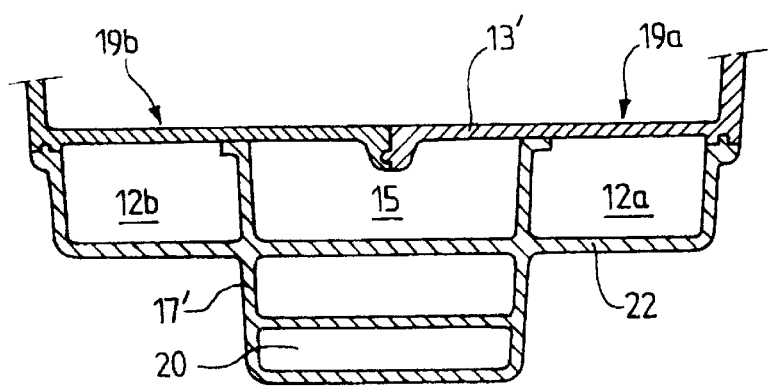
FIG. 5

INTERIOR AIR PROCESSING CASING, ESPECIALLY FOR AN AUTOMOBILE VEHICLE

The invention relates to the installations for heating and/or air-conditioning a passenger compartment, especially of a motor vehicle, which is subdivided into areas called "front" and "rear".

Some of these treatment enclosures comprise an inlet which supplies them with cool air, at least one front channel for delivering treated air to a first outlet supplying a first part of a front area of the passenger compartment, at least one second outlet for supplying a second part of this front area with treated air, a mixing chamber, supplying the first outlet and the front channel, and a heating chamber supplying the mixing chamber with heated air and supplied, just like this mixing chamber, from the cool-air inlet.

The first part of the front area generally designates the windscreen de-icing area, while the second part of this front area generally designates the right-hand and left-hand areas for ventilating the feet and/or the central ventilation area of the dashboard of the vehicle. However, it may be otherwise.

The distribution of the treated air for the rear area is generally done by an attached duct, external to the distribution enclosure, and supplied from a specific outlet. Such a configuration increases the clutter in the engine compartment and/or of the passenger compartment, as well as the complexity of the enclosure or even the number of models of enclosures.

Hence the object of the invention is to improve the situation. The invention also allows standardisation of the manufacture of the air-conditioning apparatus with or without ventilation for the rear of the vehicle.

To that end the invention proposes an air-treatment enclosure of the type described in the introduction, in which a rear channel is provided, supplied from the mixing chamber and intended to deliver treated air to a third outlet for supplying the rear area of the passenger compartment.

In one preferred application, the front channel is intended to supply treated air to the right-hand and left-hand parts of the front area of the passenger compartment of a motor vehicle (the parts being the central or low ventilation areas, for example).

In that way, some of the treated air, intended, for example, for the front areas for ventilating the feet, can be tapped off directly into the mixing chamber in order to supply the rear area. This makes it possible to reduce the size while simplifying the architecture of the air-treatment enclosure.

In one preferred embodiment, the enclosure according to the invention is formed by two assembled half-shells. In this case, it is advantageous for the rear channel to be an attached duct formed from one or two pieces and housed in the front channel. This in fact makes it possible to start with conventional treated-air-distribution enclosures which are cut out in order to form the second outlet and in which the duct is housed before coupling the two half-shells together. However, the rear channel could be delimited by an attached wall co-operating with one wall of the enclosure.

According to another characteristic of the invention, the enclosure may include an auxiliary channel, for example an attached duct, equipped with a first end, tapping off cool air between the cool-air inlet and the mixing chamber, and with a second end, delivering this tapped-off cool air in the vicinity of the inlet of the rear channel.

Figure 2:
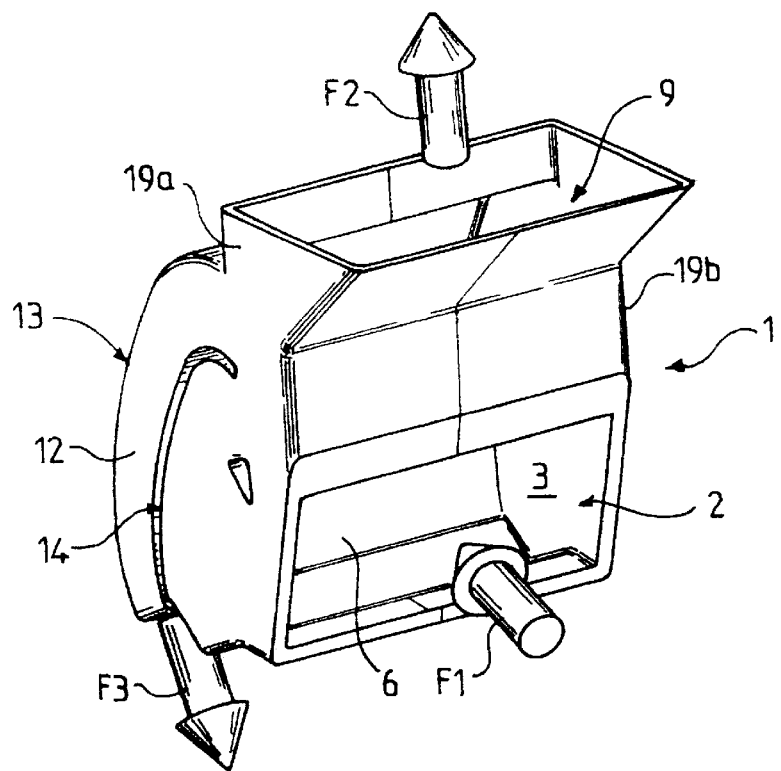

In the description which follows, given by way of example, reference is made to the attached drawings, in which:

FIG. 1 is a diagrammatic cross-sectional view of an air-treatment enclosure according to the invention;

FIG. 2, in a perspective view, illustrates a distribution enclosure according to the invention;

FIG. 3, in a perspective view, illustrates a distribution enclosure according to the invention in the course of assembly;

FIG. 4, in a sectional view, illustrates a first variant embodiment of a rear channel;

FIG. 5, in a sectional view, illustrates a second variant embodiment of a rear channel; and FIG. 6 is a sectional view along the axis VI—VI of FIG. 1.

Referring first of all to FIGS. 1 to 3, an enclosure according to the invention is described in a non-limiting way, this enclosure being intended to treat air in an installation for heating and/or air-conditioning a motor-vehicle passenger compartment.

The air-treatment enclosure 1, illustrated by way of example in FIGS. 1 to 3, is supplied with cool air (recirculated or external) by a motor-driven fan unit (not represented). It therefore comprises an inlet 2 through which the cool air penetrates (arrow F1), and which supplies a supply chamber 3.

This supply chamber 3 communicates with a mixing chamber 4 and a heating chamber 5. The heating chamber includes a radiator 6 intended to heat up the cool air leaving the supply chamber 3, and an outlet 7 which supplies the mixing chamber 4 with heated air. The two accesses to the mixing chamber 4 are, in the example illustrated in FIG. 1, controlled by a single mixing flap 8 of a shape suitable for this purpose.

The mixing chamber 4 includes at least two outlets, a first outlet 9 intended to supply treated air (see arrow F2 of FIG. 2) to a first part of the front area of the passenger compartment of the motor vehicle, and a second outlet 10 which supplies treated air (see arrow F3 of FIG. 2) to a second part of this front area. For example, the first part includes the de-icing area (situated just above the dashboard of the vehicle) and the central ventilation area (dashboard), while the second part designates the feet-ventilation area. In this example, access to the first outlet 9 is controlled by a flap of flag type 11.

In the embodiment illustrated in FIGS. 1 to 3, the second outlet 10 supplies a channel called "front" channel 12, delimited by outer 13 and inner 14 walls of the enclosure 1, and intended, via two outlets 21 formed in the outer wall 13 of the enclosure 1, to supply two ducts (not represented) which, in the embodiment illustrated, supply the right-hand and left-hand feet-ventilation parts (second part of the front area of the passenger compartment).

According to the invention, the enclosure includes a channel called "rear" channel 15 comprising a first end 16 opening out into the mixing chamber at a chosen location, and a second end 17 for delivering the treated air, via an aperture 20 (third outlet) formed in the outer wall 13 of the enclosure 1, to a distribution duct (not represented) intended to supply the rear area of the passenger compartment.

The rear channel 15 may include a double wall, or else be covered with a thermally insulating material, so as to limit heat transfer between the air which flows inside (15) and the air which flows in the front channel (or channels) 12.

The enclosure 1 is preferably intended to be housed in a substantially central position in the engine compartment so that the rear channel 15 can supply a distribution duct housed in the console placed between the front seats.

In the embodiment illustrated in FIGS. 1 to 3, the rear channel 15 is delimited by a duct 18 housed within the front channel 12. The rear channel here is therefore supplied via the second outlet 10.

As illustrated in FIG. 3, the treatment enclosure 3 is preferably produced by assembling two half-shells 19a and 19b which jointly delimit the air inlet 2, the front channel 12 and the outlets 9, 20 and 21.

Advantageously, in this embodiment, the duct 18 is housed, as regards a first half, in the half-channel which the half-shell 19a delimits and, as regards a second half, in the half-channel which the half-shell 19b delimits. Because of this positioning in the front channel 12, the duct 18 subdivides the said front channel 12 into two sub-channels 12a and 12b which respectively supply two sub-outlets 21a and 21b.

This embodiment exhibits a real benefit to the extent that it makes it possible to start with half-shells of the air-treatment enclosures of the prior art. It is sufficient, in fact, to form, for example by cutting-out, a half-outlet 20a or 20b in the outer wall 13 of each half-shell 19a or 19b, in order to produce the second outlet 20 once the two half-shells 19a and 19b have been assembled.

The duct 18 is illustrated in the form of a single-piece attached component preferably featuring a rectangular or square cross section. However, it could be produced by assembling two pieces, and its shape and the method for producing it could be different.

Hence, as illustrated in FIG. 4, the channel may be delimited jointly by an "open" duct 18', of U-shaped cross section, and by the inner face of the outer wall 13 of the enclosure 1. As is illustrated, the duct 18' does not necessarily subdivide the front channel 12 into two independent sub-channels. Its shape is therefore adapted to requirements. In a variant embodiment, it is even possible to envisage the rear channel 15 being placed laterally in the front channel 12. In this case, a simple partition may suffice to delimit the front 12 and rear 15 channels.

In another embodiment, illustrated in FIG. 5, the two front channels 12a and 12b and the rear channel 15 are delimited jointly by a shaped, attached wall 22, which co-operates with the outer face of the outer wall 13' of the enclosure 1. This attached wall 22, in a lower part, includes a substantially perpendicular extension which lengthens the rear channel 15 by forming a sort of end 17' of the same type as the end 17 of the duct 18 (see FIG. 1). This end 17' terminates in the outlet 20.

In such an embodiment, the enclosure therefore comprises, in the region of the wall delimiting its mixing chamber 5, an aperture forming an outlet for supplying the two front channels 12a and 12b and the rear channel 15.

Furthermore, in the example illustrated in FIG. 5, the rear channel 15 is formed between the two substantially identical front channels 12a and 12b, but other arrangements may be envisaged. For example, the two front channels could be different from one another, or else they could be one beside the other. It is also possible to envisage an enclosure equipped with a single front channel and with the rear channel.

Furthermore, and although this is not represented on FIGS. 1 and 2, provision may be made, at the two ends of the rear channel 15 (or of the duct which at least partially delimits it), in the region of its inlet and outlet, for a gasket so as, especially, to isolate the airflows intended respectively for the rear area and for the right-hand and left-hand front areas.

Moreover, as illustrated in FIG. 1, the treatment enclosure 1 may include, preferably in its mixing chamber 4, an auxiliary channel 23 comprising a first end 24 intended to tap off cool air from the supply chamber 3, or at the outlet therefrom, as well as a second end 25 intended to supply at least the rear channel 15 with cool air. Obviously, in this embodiment, the shape of the mixing flap 8 should be matched to the shape of the auxiliary duct 23, and especially to that of its ends 24 and 25. This mixing flap may also include vanes intended to favour the routing of hot air to at least one of the outlets from the mixing chamber. The auxiliary channel 23 is preferably delimited by an auxiliary duct 26.

In that way, it is possible to set up a temperature difference between the airflow intended for the front ventilation areas and the airflow intended for the rear area.

The invention is not limited to the embodiments described above, solely by way of example, but it embraces all the variants which the person skilled in the art could develop within the context of the claims below.

Thus an embodiment has been described in which the enclosure consists of two half-shells which, with the integrated duct, delimit two front sub-channels for supplying the right-hand and left-hand front areas. However, the enclosure could initially delimit two channels supplied from a single inlet, or from two independent inlets, and supplying two independent outlets.

What is claimed is:

1. Enclosure for treating air of a passenger compartment, comprising a cool-air supply inlet (2), a first outlet (9) for supplying a first part of a front area of the passenger compartment, at least one additional outlet (10) suitable for supplying treated air to at least one front channel (12) intended for delivering treated air to a second part of said front area, a mixing chamber (4) and a heating chamber (5) which are supplied from said inlet (2), said heating chamber (5) being suitable for supplying heated air to said mixing chamber (4), which supplies said first outlet (9) and said front channel (12), wherein the enclosure includes a dedicated rear channel (15) supplied from said mixing chamber (4) for dedicated delivery of treated air to a third outlet (20) for supplying a rear area of the passenger compartment.

2. Enclosure according to claim 1, wherein the enclosure is formed from two assembled half-shells (19a, 19b).

3. Enclosure according to claim 2, wherein said third outlet (20) is produced by cutting out the walls of the two half-shells (19a, 19b).

4. Enclosure according to claim 1, said enclosure includes two front channels (12a, 12b) supplying two first outlets (21a, 21b).

5. Enclosure according to claim 4, wherein said front channels (12a, 12b) are placed on either side of the rear channel (15).

6. Enclosure according to claim 4, wherein said rear channel (15) and said front channels (12a, 12b) are delimited jointly by an attached wall (22) which co-operates with another wall (13') of said enclosure.

7. Enclosure according to claim 1, wherein said rear channel (15) is delimited by a duct (18, 18') housed in said front channel (12).

8. Enclosure according to claim 7, wherein said rear channel (15) features a substantially rectangular cross section.

9. Enclosure according to claim 8, wherein said duct (18) is configured in such a way as to delimit two front sub-channels (12a, 12b) in said front channel (12) and two first sub-outlets (21a, 21b) of said front sub-channels.

10. Enclosure according to claim 9, wherein said duct (18') exhibits a substantially U-shaped cross section and delimits the rear channel (11) jointly with a wall (13) of said enclosure, which delimits said front channel (12).

11. Enclosure according to claim 1, further comprising an auxiliary channel (23) equipped with a first end (24) suitable for tapping off cool air between said cool-air inlet (2) and the mixing chamber (4) and with a second end (25) suitable for delivering said tapped-off cool air in a vicinity of the inlet (16) of the rear channel (15).

12. Enclosure according to claim 11, wherein said auxiliary channel (23) is delimited by an auxiliary duct (26).

13. Enclosure according to claim 1, wherein said rear channel (15) includes a gasket in at least one of its ends (16, 17).

14. (Amended) Enclosure according to claim 1, wherein said rear channel (15) includes a double wall suitable for limiting the heat transfer between the air flowing in said rear channel (15) and the air flowing in said front channel (12).

15. Enclosure according to claim 1, wherein said rear channel (15) is covered with a thermally insulating material suitable for limiting the heat transfer between the air flowing in said rear channel (15) and the air flowing in said front channel 12.

16. Use of an enclosure according to claim 15, for distribution of treated air by said first (12a) and second (12b) front channels or sub-channels in right-hand and left-hand parts of the front area of the passenger compartment.

17. Use according to claim 16, in which said right-hand and left-hand parts are ventilation areas.

18. Enclosure for treating air of a passenger compartment, comprising a cool-air supply inlet (2), a first outlet (9) for supplying a first part of a front area of the passenger compartment, at least one additional outlet (10) suitable for supplying treated air to at least one front channel (12) intended for delivering treated air to a second part of said front area, a mixing chamber (4) and a heating chamber (5) which are supplied from said inlet (2), said heating chamber (5) being suitable for supplying heated air to said mixing chamber (4), which supplies said first outlet (9) and said front channel (12), wherein the enclosure includes a rear channel (15) supplied from said mixing chamber (4) and intended for delivering treated air to a third outlet (20) for supplying a rear area of the passenger compartment, and wherein the rear channel (15) is defmed by a duct at least partly housed within said front channel (12).

* * * * *